US008215764B2

(12) United States Patent
Sano et al.

(10) Patent No.: US 8,215,764 B2

(45) Date of Patent: Jul. 10, 2012

(54) INK JET RECORDING METHOD AND RECORD

(75) Inventors: Tsuyoshi Sano, Shiojiri (JP); Takashi Oyanagi, Matsumoto (JP); Akio Ito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 12/691,763

(22) Filed: Jan. 22, 2010

(65) Prior Publication Data

US 2010/0187805 A1 Jul. 29, 2010

(30) Foreign Application Priority Data

Jan. 27, 2009 (JP) ................................ 2009-015078

(51) Int. Cl.
*B41J 2/01* (2006.01)
*G01D 11/00* (2006.01)

(52) U.S. Cl. ......... 347/105; 347/102; 347/101; 347/100

(58) Field of Classification Search .................. 347/100, 347/95, 96, 101, 102, 103, 105; 106/31.6, 106/31.13, 31.27; 523/160, 161; 428/195, 428/32.1
See application file for complete search history.

(56) References Cited

U.S. PATENT DOCUMENTS

| | | | | |
|---|---|---|---|---|
| 5,644,350 | A * | 7/1997 | Ando et al. | 347/101 |
| 6,086,197 | A * | 7/2000 | Kubota et al. | 347/100 |
| 6,426,375 | B1 * | 7/2002 | Kubota | 347/105 |
| 2001/0020964 | A1 * | 9/2001 | Irihara et al. | 347/43 |
| 2004/0209774 | A1 * | 10/2004 | Odamura et al. | 503/227 |
| 2007/0006127 | A1 * | 1/2007 | Kuntz et al. | 717/104 |
| 2008/0028980 | A1 * | 2/2008 | Aoki et al. | 347/100 |
| 2008/0081124 | A1 | 4/2008 | Sano et al. | |

FOREIGN PATENT DOCUMENTS

| | | | |
|---|---|---|---|
| EP | 1 547 793 | A1 | 6/2005 |
| JP | 2003-292832 | A | 10/2003 |
| JP | 2005-068250 | A | 3/2005 |
| JP | 2005-068251 | A | 3/2005 |
| JP | 2007-76033 | A | 3/2007 |
| JP | 2007-291399 | A | 11/2007 |
| JP | 2008-088228 | A | 4/2008 |

OTHER PUBLICATIONS

English Abstract of Japanese Application No. 2008-088228A Published Apr. 17, 2008.
English Abstract of Japanese Application No. 2005-068250A Published Mar. 17, 2005.
English Abstract of Japanese Application No. 2005-068251A Published Mar. 17, 2005.
English Abstract of Japanese Application No. 2007-291399A Published Nov. 8, 2007.
English Abstract of Japanese Application No. 2007-76033A Published Mar. 29, 2007.
English Abstract of Japanese Application No. 2003-292832A Published Oct. 15, 2003.

* cited by examiner

*Primary Examiner* — Manish S Shah
(74) *Attorney, Agent, or Firm* — Ladas & Parry LLP

(57) ABSTRACT

An ink jet recording method for recording an image having a metallic luster on a recording medium with an ink jet recording apparatus includes forming an underlayer on the recording medium by applying droplets of a first ink composition containing a first thermoplastic resin to the recording medium and also includes forming a metallic luster layer on the underlayer by applying droplets of a second ink composition containing a metal pigment and a second thermoplastic resin to the underlayer. The glass transition temperature of the first thermoplastic resin is lower than or equal to the glass transition temperature of the second thermoplastic resin. The underlayer is formed at a temperature higher than the glass transition temperature of the first thermoplastic resin.

8 Claims, No Drawings

INK JET RECORDING METHOD AND RECORD

BACKGROUND

1. Technical Field

The present invention relates to an ink jet recording method and a record.

2. Related Art

In recent years, there have been increasing demands for prints having images, formed on printing surfaces, having a metallic luster. The following methods have been used to form such images having a metallic luster: for example, a foil stamping printing method in which a recording medium having a flat printing surface is prepared and a metal foil is pressed against the recording medium, a method in which a metal is vacuum-deposited on a plastic film having a smooth printing surface, and a method in which a recording medium is coated with a metal pigment ink and then subjected to pressing.

Meanwhile, an ink jet recording method is a process in which printing is performed in such a manner that droplets of an ink composition are ejected and applied to a recording medium such as a sheet of paper. The ink jet recording method has an advantage that a high-resolution, high-quality image can be printed at high speed with a relatively small-sized apparatus. Therefore, it has been attempted that the ink jet recording method is used to print a record having a metallic surface. For example, JP-A-2008-088228 discloses an ink composition, containing a metal powder, for ink jet printing.

In order to obtain an image with a metallic luster by the ink jet recording method, a recording medium having a smooth surface needs to be selected because a metallic luster is achieved by forming a smooth metallic surface. Therefore, the recording medium needs to be a plastic sheet with a smooth surface or a sheet of coated paper.

It is difficult to form an image having a sufficient metallic luster on a recording medium, such as a sheet of plain paper, having substantially no coat layer by the ink jet recording method. Since plain paper absorbs ink, it is difficult to fix a metal powder on a printing surface of a sheet of plain paper.

SUMMARY

An advantage of some aspects of the invention is to provide an ink jet recording method capable of recording an image having a good metallic luster on a recording medium.

An ink jet recording method, according to the present invention, for recording an image having a metallic luster on a recording medium using an ink jet recording apparatus includes forming an underlayer on the recording medium by applying droplets of a first ink composition containing a first thermoplastic resin to the recording medium and also includes forming a metallic luster layer on the underlayer by applying droplets of a second ink composition containing a metal pigment and a second thermoplastic resin to the underlayer. The glass transition temperature of the first thermoplastic resin is lower than or equal to the glass transition temperature of the second thermoplastic resin. The underlayer is formed at a temperature higher than the glass transition temperature of the first thermoplastic resin.

This allows images having a good metallic luster to be recorded on recording media.

In the ink jet recording method, the first and second thermoplastic resins may have a glass transition temperature of 25° C. to 60° C.

In the ink jet recording method, the difference in glass transition temperature between the first and second thermoplastic resins may be less than 5° C.

In the ink jet recording method, the first and second thermoplastic resins may be of the same type.

In the ink jet recording method, the underlayer may be formed at a temperature higher than or equal to the glass transition temperature of the first thermoplastic resin.

In the ink jet recording method, the underlayer may be formed at a temperature of 40° C. to 90° C.

In the ink jet recording method, the metal pigment may contain tabular particles made of aluminum or an aluminum alloy and the 50% average particle size based on the equivalent circle diameter determined from the area of the X-Y plane of each tabular particle may be 0.5 to 3 μm and may satisfy the inequality $R50/Z>5$, wherein R50 represents the 50% average particle size, X and Y represent the longitudinal size and transverse size, respectively, of a flat surface of the tabular particle, and Z represents the thickness of the tabular particle.

A record according to the present invention includes a recording medium and an image, formed on the recording medium by the ink jet recording method, having a metallic luster.

An ink jet recording method according to the present invention is capable of recording an image with a good metallic luster on a recording medium such as a sheet of plain paper because an underlayer is formed on the recording medium and a metallic luster layer is formed on the underlayer.

DESCRIPTION OF EXEMPLARY EMBODIMENTS

Preferred embodiments of the present invention will now be described. The embodiments exemplify the present invention.

An ink jet recording method according to the present invention is used to record an image having a metallic luster on a recording medium using an ink jet recording apparatus and includes a step of forming an underlayer and a step of forming a metallic luster layer.

In the ink jet recording method, the recording medium is not particularly limited and includes a sheet of plain paper on which an image having a metallic luster is hardly formed by a conventional method. The term "plain paper" as used herein covers uncoated printing paper and slightly coated printing paper such as printing paper grade A, printing paper grade B, printing paper grade C, and printing paper grade D specified in No. 6009, No. 6010, No. 6011, and No. 6012, respectively, of JIS P 0001; ultra-lightweight coat paper specified in No. 6141 of JIS P 0001; and paper for indirect electrostatic process specified in No. 6139 of JIS P 0001. The term "plain paper" as used herein also covers uncoated wrapping paper and liner and corrugating media. Most of sheets of plain paper absorb liquids and have surface irregularities.

In the ink jet recording method, the ink jet recording apparatus is used to eject droplets of each ink compositions. The ink jet recording apparatus is not particularly limited except that the ink jet recording apparatus ejects ink droplets such that an image is recorded by applying the ink droplets to the recording medium.

Examples of a recording method using the ink jet recording apparatus include an electrostatic attraction method in which a strong electric field is applied between a nozzle and an accelerating electrode disposed in front of the nozzle, droplets of ink are continuously ejected from the nozzle, and recording is performed in such a manner that printing information signals are applied to deflection electrodes while the ink droplets are passing between the deflection electrodes or in such a manner that the ink droplets are caused to travel in accordance with the printing information signals without deflecting the ink droplets, a method in which ink droplets are ejected in such a manner that an ink solution is pressurized with a micro-pump and a nozzle is mechanically vibrated with a quartz oscillator, a piezoelectric method in which ink droplets are ejected to perform recording in such a manner that a pressure and a printing information signal are applied to an ink solution with a piezoelectric element, and a thermal jet method in which ink droplets are ejected to perform recording in such a manner that an ink solution is heated and bubbled with a micro-electrode in accordance with an printing information signal.

The ink jet recording apparatus includes, for example, an ink jet recording head, a body, a tray, a head drive, and a carriage. The ink jet recording apparatus may further include a unit for heating the recording medium during recording. Examples of such a unit include carriages carrying infrared lamps for heating recording media and heaters that heat rollers conveying recording media to heat the recording media. Examples of a technique for heating the recording medium include a technique in which the recording medium is heated by contacting the recording medium with a heat source, a technique in which the recording medium is heated in a non-contact way by applying infrared rays, microwaves such as electromagnetic waves having a maximum wavelength at about 2,450 MHz, or hot air to the recording medium. The recording medium may be heated in advance of recording, simultaneously with recording, subsequently to recording, or during recording.

The ink jet recording head includes ink cartridges of at least four colors: cyan, magenta, yellow, and black. Therefore, the ink jet recording head is capable of performing full-color printing. In this embodiment, at least two of the ink cartridges are each filled with a corresponding one of a first ink composition and a second ink composition. The ink jet recording apparatus further includes a dedicated control board placed therein and therefore the timing of ejecting ink from the ink jet recording head and the operation of the head drive can be controlled.

In the ink jet recording method, the underlayer is formed in such a manner that droplets of the first ink composition are ejected from the ink jet recording apparatus and are applied to the recording medium. The first ink composition contains a first thermoplastic resin. The underlayer has a function of preventing the second ink composition from penetrating the recording medium to allow a component of the second ink composition to remain on the recording medium. The underlayer has a flat surface on which the metallic luster layer is to be formed. The interface between the underlayer and the metallic luster layer may be clear or unclear.

The underlayer is formed at a temperature higher than the glass transition temperature of the first thermoplastic resin. The recording medium can be heated with the unit for heating the recording medium. The underlayer may be formed at a temperature that is higher than the glass transition temperature of the first thermoplastic resin and lower than or equal to a temperature at which the ink jet recording apparatus can be used. Alternatively, the underlayer may be formed at a temperature higher than or equal to room temperature. When the recording medium is a sheet of plain paper, which has no coat or plastic layer sensitive to heat, the underlayer can therefore be formed at a temperature of, for example, 20° C. to 150° C. The underlayer is preferably formed at a temperature of 25° C. to 110° C., more preferably 30° C. to 100° C., and further more preferably 40° C. to 90° C. This allows the first thermoplastic resin to be selected from a wide range of materials and also allows the underlayer to be quickly dried when the first ink composition contains a solvent.

The underlayer preferably has a thickness of 0.1 to 20 μm and more preferably 0.2 to 10 μm. When the thickness of the underlayer is less than 0.1 μm, the penetration-preventing function or flatness of the underlayer is possibly insufficient.

The first ink composition, which is used to form the underlayer, contains the first thermoplastic resin as described above. Components of the first ink composition are described below.

The first thermoplastic resin, which is contained in the first ink composition, may be any one as long as droplets of the first ink composition can be ejected by the ink jet recording method. Examples of the first thermoplastic resin include (meth)acrylic resins, styrene-acrylic resins, rosin-modified resins, phenolic resins, terpene resins, polyesters, polyamides, epoxy resins, vinyl chloride-vinyl acetate copolymers, cellulose resins such as cellulose acetate butyrate, and vinyltoluene-α-methylstyrene copolymers. These resins can be used alone or in combination. The first thermoplastic resin may be a mixture of some of these resins.

In particular, the first thermoplastic resin is preferably a (meth)acrylic resin, that is, an acrylic or methacrylic resin and more preferably poly(methyl methacrylate) or a copolymer of methyl methacrylate and butyl methacrylate.

The first thermoplastic resin preferably has a weight-average molecular weight of 10,000 to 150,000 and more preferably 10,000 to 100,000. When the weight-average molecular weight of the first thermoplastic resin is less than 10,000, the first ink composition possibly has a viscosity insufficient to adhere to the recording medium. When the weight-average molecular weight thereof is greater than 150,000, the first ink composition has a viscosity too large to eject the first ink composition from the ink jet recording apparatus.

The first thermoplastic resin may be present in the first ink composition in the form of a liquid, an emulsion, or dispersed particles. When the first thermoplastic resin is present in the form of particles, the particles preferably have a size of 0.1 to 20 μm and more preferably 0.5 to 10 μm. When the particle size is greater than 20 μm, nozzles included in the ink jet recording apparatus are possibly clogged.

The glass transition temperature (hereinafter referred to as Tg in some cases) of the first thermoplastic resin is lower than or equal to that of a second thermoplastic resin described below. The first thermoplastic resin has a large elastic modulus at a temperature lower than the glass transition temperature thereof and a small elastic modulus at a temperature higher than the glass transition temperature thereof. Therefore, the first thermoplastic resin is likely to plastically deform at temperatures higher than the glass transition temperature thereof.

The first thermoplastic resin has a function of increasing the viscosity of the first ink composition to prevent the first ink composition from penetrate the recording medium when the first ink composition is applied to the recording medium. This allows the first ink composition to remain near a surface portion of the recording medium and therefore the underlayer can be formed well. The first thermoplastic resin is selected to have a Tg lower than a temperature at which the underlayer is formed. Therefore, when the first ink composition is applied to the recording medium, the first thermoplastic resin is fluidized or deformed; hence, the underlayer has high surface flatness. This allows the metallic luster layer, which is formed on the underlayer, to have a metallic surface with a good luster.

The first thermoplastic resin preferably has a glass transition temperature of 10° C. to 130° C., more preferably 15° C. to 110° C., further more preferably 20° C. to 85° C., and still further more preferably 25° C. to 60° C. When the glass transition temperature of the first thermoplastic resin is excessively high, the ink jet recording apparatus, which is used to form the underlayer, cannot possibly heat the first thermoplastic resin to a temperature higher than the glass transition temperature of the first thermoplastic resin.

The content of the first thermoplastic resin in the first ink composition is preferably 0.01% to 50%, more preferably 0.05% to 40%, and further more preferably 0.1% to 30% on a mass basis.

The first ink composition may contain an organic solvent. The organic solvent is preferably a polar one. Examples of the organic solvent include alcohols such as methanol, ethanol, propanol, isopropanol, butanol, and fluoroalcohols; ketones such as acetone, methyl ethyl ketone, and cyclohexanone; carboxylic esters such as methyl acetate, ethyl acetate, propyl acetate, butyl acetate, methyl propionate, and ethyl propionate; ethers such as diethyl ether, dipropyl ether, tetrahydrofuran, and dioxane; and lactones. In particular, the organic solvent preferably contains one or more of alkylene glycol ethers that are liquid at room temperature and atmospheric pressure.

Examples of the alkylene glycol ethers include ethylene glycol ethers and propylene glycol ethers containing an aliphatic group such as a methyl group, a n-propyl group, an i-propyl group, a n-butyl group, an i-butyl group, a hexyl group, or a 2-hexyl group or an unsaturated group such as an aryl group or a phenyl group. The alkylene glycol ethers are preferred because the alkylene glycol ethers are colorless, smell slightly, contain an ether group and a hydroxyl group, therefore have properties common to alcohols and ethers, and are liquid at room temperature and atmospheric pressure. Other examples of the alkylene glycol ethers include alkylene glycol monoethers each having a substituent derived from a single hydroxyl group and alkylene glycol diethers each having substituents derived from both hydroxyl groups. These ethers can be used in combination.

Examples of the alkylene glycol monoethers include ethylene glycol monomethyl ether, ethylene glycol monoethyl ether, ethylene glycol mono-iso-propyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, dipropylene glycol monomethyl ether, dipropylene glycol monoethyl ether, and dipropylene glycol monobutyl ether.

Examples of the alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dipropyl ether, diethylene glycol di-iso-propyl ether, diethylene glycol dibutyl ether, diethylene glycol ethyl methyl ether, triethylene glycol dimethyl ether, triethylene glycol diethyl ether, triethylene glycol dibutyl ether, triethylene glycol ethyl methyl ether, tetraethylene glycol dimethyl ether, tetraethylene glycol diethyl ether, tetraethylene glycol dibutyl ether, tetraethylene glycol ethyl methyl ether, propylene glycol dimethyl ether, propylene glycol diethyl ether, dipropylene glycol dimethyl ether, and dipropylene glycol diethyl ether.

Examples of the lactones include cyclic ester compounds such as γ-lactones with a five-membered ring, δ-lactones with a six-membered ring, and ϵ-lactones with a seven-membered ring. Particular examples of the lactones include γ-butyrolactone, γ-valerolactone, γ-hexylactone, γ-heptalactone, γ-octalactone, γ-nonalactone, γ-decalactone, γ-undecalactone, δ-valerolactone, δ-hexylactone, δ-heptalactone, δ-octalactone, δ-nonalactone, δ-decalactone, δ-undecalactone, and ϵ-caprolactone. Preferable examples of the lactones include γ-butyrolactone, δ-valerolactone, and ϵ-caprolactone.

In particular, the organic solvent, which is contained in the first ink composition, is preferably at least one of diethylene glycol diethyl ether and γ-butyrolactone.

When the first ink composition contains a solvent mixture, the solvent mixture preferably contains, for example, 0.02 to 4 mass parts of a lactone solvent per mass part of an alkylene glycol alkyl ether solvent and more preferably 0.05 to 2 mass parts. The content of the solvent mixture in the first ink composition is preferably 50% and more preferably 70% on a mass basis. This provides increased printing stability.

In order to prevent the first ink composition from being vaporized or solidified in a nozzle portion or a tube disposed in the ink jet recording apparatus or in order to re-melt the solidified first ink composition, the organic solvent is preferably used in combination with triethyl citrate.

The organic solvent may be a nonionic polyoxyethylene derivative that is liquid at atmospheric pressure. Examples of the nonionic polyoxyethylene derivative include polyoxyethylene alkyl ethers such as polyoxyethylene cetyl ethers including Nissan Nonion P-208 available from NOF Corporation, polyoxyethylene oleyl ethers including Nissan Nonion E-202S and E-205S available from NOF Corporation, and polyoxyethylene lauryl ethers including Emulgen 106 and 108 available from Kao Corporation; polyoxyethylene alkylphenol ethers such as polyoxyethylene octylphenol ethers including Nissan Nonion HS-204, HS-205, HS-206, and HS-208 available from NOF Corporation; sorbitan monoesters such as sorbitan monocaprylate including Nissan Nonion CP-08R available from NOF Corporation and sorbitan monolaurate such as Nissan Nonion LP-20R available from NOF Corporation; polyoxyethylene sorbitan monoesters such as polyoxyethylene sorbitan monostearates including Nissan Nonion OT-221 available from NOF Corporation; polycarboxylic polymer activators such as Flowlen G-70 available from Kyoeisha Chemical Co., Ltd.; polyoxyethylene higher alcohol ethers such as Emulgen 707 and 709 available from Kao Corporation; tetraglycerin oleate such as Poem J-4581 available from Riken Vitamin Co., Ltd.; nonylphenol ethoxylates such as Adeka Tol NP-620, NP-650, NP-660, NP-675, NP-683, and NP-686 available from Adeka Corporation; aliphatic phosphates such as Adeka Col CS-141E and TS-230E available from Adeka Corporation; sorbitan sesquioleates such as Solgen 30 available from Dai-ichi Kogyo Seiyaku CO., LTD.; sorbitan monooleates such as Solgen 40 available from Dai-ichi Kogyo Seiyaku CO., LTD.; polyethylene glycol sorbitan monolaurates such as Solgen TW-20 available from Dai-ichi Kogyo Seiyaku CO., LTD.; and polyethylene glycol sorbitan monoleates such as Solgen TW-80 available from Dai-ichi Kogyo Seiyaku CO., LTD.

These solvents may be used alone or in combination. This allows the dispersion stability of a colorant and the volatility of ink to be controlled and also allows properties such as the viscosity of ink to be adjusted.

The first ink composition may contain a surfactant. Examples of the surfactant include acetylene glycol surfactants. Particular examples of the surfactant include 2,4,7,9-tetramethyl-5-decyne-4,7-diol, 3,6-dimethyl-4-octyne-3,6-diol, and 3,5-dimethyl-1-hexyne-3-ol. Commercially available examples of the surfactant include Surfynol 104, 82, 465, 485, and TG available from Air Products and Chemicals, Inc.; Olfine STG and E1010 available from Nissin Chemical Industry Co., Ltd.; Nissan Nonion A-10R and A-13R available from NOF Corporation; Flowlen TG-740W and D-90 available from Kyoeisha Chemical Co., Ltd.; Emulgen A-90 and A-60 available from Kao Corporation; and Noigen CX-100 available from Dai-ichi Kogyo Seiyaku CO., LTD. These surfactants may be used alone or in combination. These surfactants render the first ink composition less volatile and therefore can prevent the first ink composition from vaporizing in tubes for supplying the first ink composition from the ink cartridges to a printer head to prevent or suppress the deposition of solids in the tubes. The content of the surfactant in the first ink composition is preferably 0.01% to 48% and more preferably 5% to 30% on a mass basis.

The first ink composition may contain a colorant and a dispersant. When the first ink composition contains the colorant, the underlayer is colored and a region where the underlayer is exposed can be subjected to ordinary printing.

The colorant is one for use in ordinary ink and can be used in the first ink composition without any particular limitation. Examples of the colorant include pigments and dyes.

Examples of the dyes include various dyes, such as direct dyes, acid dyes, food dyes, basic dyes, reactive dyes, dispersed dyes, vat dyes, soluble vat dyes, and reactive dispersion dyes, usually used for ink jet recording.

The pigments are not particularly limited. Examples of the pigments include inorganic pigments and organic pigments.

Examples of the inorganic pigments include titanium oxides, iron oxides, and carbon black produced by a known process such as a contact process, a furnace process, or a thermal process. Examples of the organic pigments include azo pigments such as azo lakes, insoluble azo pigments, condensed azo pigments, and chelate azo pigments; polycyclic pigments such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates such as basic dye chelates and acidic dye chelates; nitro pigments; nitroso pigments; and aniline black.

Particular examples of the pigments include black pigments, yellow pigments, magenta pigments, cyan pigments, and white pigments. Examples of the black pigments include carbon blacks such as C. I. Pigment Black 7; Carbon Black No. 2300, No. 900, MCF88, No. 33, No. 40, No. 45, No. 52, MA7, MA8, MA100, No. 2200B available from Mitsubishi Kasei Corporation; Raven 5750, Raven 5250, Raven 5000, Raven 3500, Raven 1255, and Raven 700 available from Colombia; Regal 400R, Regal 330R, Regal 660R, Mogul L, Mogul 700, Monarch 800, Monarch 880, Monarch 900, Monarch 1000, Monarch 1100, Monarch 1300, and Monarch 1400 available from Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 available from Degussa.

Examples of the yellow pigments include C. I. Pigment Yellows 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Examples of the magenta pigments include C. I. Pigment Reds 5, 7, 12, 48(Ca), 48(Mn), 57(Ca), 57:1, 112, 122, 123, 168, 184, 202, 209, and C. I. Pigment Violet 19.

Examples of the cyan pigments include C. I. Pigment Blues 1, 2, 3, 15:3, 15:4, 60, 16, and 22.

Examples of the white pigments include C. I. Pigment White 6.

When the first ink composition contains a pigment, the pigment preferably has an average particle size of about 10 to 200 nm and more preferably about 50 to 150 nm.

When the first ink composition contains the colorant, the content of the colorant in the first ink composition is preferably 0.1% to 25% and more preferably 0.5% to 15% on a mass basis.

When the first ink composition contains the pigment, the pigment may be used in the form of a dispersion prepared by dispersing the pigment in a medium with the aid of a dispersant or a surfactant. Preferable examples of the dispersant include common dispersants, such as polymeric dispersants, used to prepare pigment dispersions.

The first ink composition may contain a plurality of colorants. The first ink composition may contain, for example, four basic colorants, that is, a yellow colorant, a magenta colorant, a cyan colorant, and a black colorant and may further contain colorants lighter or darker than each of the four basic colorants. That is, the first ink composition may contain a light magenta colorant, a red colorant, a light cyan colorant, a blue colorant, a gray colorant, a light black colorant, and a mat black colorant in addition to the yellow, magenta, cyan, black colorants.

The dispersant may be any one for use in ordinary ink. The dispersant is preferably one that acts effectively when the organic solvent has a solubility parameter of 8 to 11. Commercially available examples of the dispersant include polyester compounds such as Hinoacto KF1-M, T-6000, T-7000, T-8000, T-8350P, and T-8000 EL available from Takefu Fine Chemicals Co., Ltd.; dispersants such as Solsperse 20000, 24000, 32000, 32500, 33500, 34000, and 35200 available from Avecia K. K.; dispersants such as Disperbyk-161, 162, 163, 164, 166, 180, 190, 191, and 192 available from Byk Chemie; dispersants such as Flowlen DOPA-17, DOPA-22, DOPA-33, and G-700 available from Kyoeisha Chemical Co., Ltd.; dispersants such as Ajisper PB821 and PB711 available from Ajinomoto Co., Inc.; and dispersants such as LP4010, LP4050, LP4055, POLYMER 400, POLYMER 401, POLYMER 402, POLYMER 403, POLYMER 450, POLYMER 451, and POLYMER 453 available from EFKA Chemicals. These dispersants may be used alone or in combination.

The amount of the dispersant contained in the first ink composition is preferably 5% to 200% and more preferably 30% to 120% of the amount of the colorant (particularly the pigment) contained in the first ink composition on a mass basis. The amount of the dispersant contained therein may be appropriately selected depending on the colorant.

The first ink composition may further contain a stabilizer such as an antioxidant or an ultraviolet absorber and a surfactant. Examples of the antioxidant include BHA (2,3-butyl-4-oxyanisole) and BHT (2,6-di-t-butyl-p-cresol). The content of the antioxidant in the first ink composition is preferably 0.01% to 3.0% by mass. Examples of the ultraviolet absorber include benzophenone compounds and benzotriazole compounds. The content of the ultraviolet absorber in the first ink composition is preferably 0.01% to 0.5% by mass. Examples of the surfactant include anionic surfactants, cationic surfactants, amphoteric surfactants, and nonionic surfactants. The content of the surfactant in the first ink composition is preferably 0.5% to 4.0% by mass.

In the ink jet recording method, the metallic luster layer is formed in such a manner that droplets of the second ink composition are ejected from the ink jet recording apparatus and are applied to the underlayer. The second ink composition contains the second thermoplastic resin and a metal pigment. The metallic luster layer has a function of allowing the recording medium to have a metallic surface. The metallic luster layer preferably has a thickness of 0.05 to 10 μm and more preferably 0.1 to 5 μm. When the thickness of the metallic luster layer is less than 0.05 μm, a printing surface possibly has no metallic luster.

The metallic luster layer can be formed at room temperature and may be formed at a temperature higher than room temperature. When the recording medium is a sheet of plain paper, the metallic luster layer is preferably formed at a temperature of 20° C. to 150° C., more preferably 25° C. to 110° C., further more preferably 30° C. to 100° C., and still further more preferably 40° C. to 90° C. This allows the second ink composition to be quickly dried when the second ink composition contains a solvent. In the case of forming the metallic luster layer at a temperature higher than the glass transition temperature of the second ink composition, the metallic luster layer has an enhanced metallic luster.

The second ink composition contains the second thermoplastic resin and the metal pigment as described above. Components of the second ink composition are described below.

The metal pigment, which is contained in the second ink composition, may be any one as long as droplets of the second ink composition can be ejected by the ink jet recording method. The metal pigment exhibits a metallic luster after the second ink composition is applied to the underlayer. The metal pigment can give a metallic luster to deposits. The metal pigment may contain particles of at least one selected from the group consisting of silver, gold, platinum, nickel, chromium, tin, zinc, indium, titanium, and copper or particles of at least one of alloys and mixtures of these metals.

The metal pigment preferably contains aluminum or an aluminum alloy in view of cost and a high degree of metallic luster. When the metal pigment contains the aluminum alloy, a metal or base metal element contained in the aluminum alloy is not particularly limited and has a metallic luster. The metal or base metal element is preferably at least one selected from the group consisting of silver, gold, platinum, nickel, chromium, tin, zinc, indium, titanium, and copper.

The size distribution (CV) of particles in the metal pigment is determined from the following equation:

$$CV = (\text{standard deviation of size distribution})/(\text{average particle size}) \times 100 \quad (1)$$

The CV of the metal pigment is preferably 60 or less, more preferably 50 or less, and further more preferably 40 or less. When the CV of the metal pigment is 60 or less, the ink jet recording method has an advantage that the second ink composition is good in printing stability.

The metal pigment may be restricted such that the particle size of the metal pigment is sufficient to eject the second ink composition by the ink jet recording method in the form of droplets and the viscosity of the second ink composition is not to high. Therefore, the metal pigment preferably contains tabular particles. The use of the metal pigment allows the metallic luster of the metallic luster layer, which is disposed on the underlayer, to be enhanced. Furthermore, the use of the metal pigment allows the second ink composition to be fit for the ink jet recording method. Therefore, the content of the metal pigment in the second ink composition can be increased; hence, the luster of the metallic luster layer can be further enhanced.

The term "tabular particles" as used herein means particles having substantially flat surfaces (X-Y plane) and a substantially uniform thickness. When the tabular particles are those prepared by breaking a vapor-deposited metal film, the tabular particles have substantially flat surfaces and a substantially uniform thickness. Therefore, the longitudinal size and transverse size of a flat surface of each tabular particle and the thickness of the tabular particle can be represented by X, Y, and Z, respectively.

When the metal pigment contains the tabular particles, it is preferred that the 50% average particle size based on the equivalent circle diameter determined from the area of the X-Y plane of each tabular particle be 0.5 to 3 μm and satisfy the inequality $R50/Z>5$, wherein R50 represents the 50% average particle size, X and Y represent the longitudinal size and transverse size, respectively, of a flat surface of the tabular particle and Z represents the thickness of the tabular particle. The 50% average particle size is more preferably 0.75 to 2 μm. When the 50% average particle size is less than 0.5 μm, an image with an insufficiently masked background is possibly formed. When the 50% average particle size is greater than 3 μm, the stability of printing is possibly low. The 50% average particle size based on the equivalent circle diameter and the thickness of the tabular particle preferably satisfy the inequality $R50/Z>5$. When the inequality $R50/Z>5$ holds, the metallic luster layer can be formed so as to have a high background-masking ability. When the inequality $R50/Z \leqq 5$ holds, the metallic luster layer is possibly formed so as to have an insufficient background-masking ability.

In view of preventing the ink jet recording apparatus from being clogged with the second ink composition, the maximum size Rmax of the equivalent circle diameter determined from the area of the X-Y plane of the tabular particle is preferably 10 μm or less. When the maximum size Rmax is 10 μm or less, the nozzles and filters, disposed in ink channels, for removing contaminants can be prevented from being clogged.

The term "equivalent circle diameter" as used herein means the diameter of a circle with the same area as the projected area of a substantially flat surface (X-Y plane) of a tabular particle. When the substantially flat surface (X-Y plane) of the tabular particle has a polygonal shape, the equivalent circle diameter of the tabular particle is defined as the diameter of a circle obtained by converting the projected image of the polygonal shape.

The 50% average particle size based on the equivalent circle diameter of the tabular particles means the equivalent circle diameter corresponding to 50% of the number of the measured tabular particles in the case of the number (frequency) distribution of the tabular particles with respect to the equivalent circle diameter thereof.

The longitudinal and transverse sizes of a flat surface of each tabular particle and the equivalent circle diameter of the tabular particle can be measured with, for example, a particle image analyzer. Examples of the particle image analyzer include flow-type particle image analyzers, FPIA-2100, FPIA-3000, and FPIA-3000S, available from Sysmex Corporation.

The tabular particles, which are contained in the metal pigment, can be produced as described below. The following precursor is produced: a composite pigment precursor having a configuration in which a strippable resin layer and a metal or metal compound layer are arranged on a sheet-shaped base member in that order. The metal or metal compound layer is stripped from the sheet-shaped base member with the strippable resin layer used as a boundary and is then finely pulverized into the tabular particles.

The metal or metal compound layer is preferably formed by a vacuum vapor deposition process, an ion plating process, or a sputtering process.

The metal or metal compound layer preferably has a thickness of 20 to 100 nm. This allows the tabular particles to have an average thickness of 20 to 100 nm. When the average thickness of the tabular particles is 20 nm or more, the metal pigment exhibits good reflectance and a good luster. When the average thickness thereof is 100 nm or less, the metal pigment can be prevented from being increased in apparent density and can be stably dispersed in the second ink composition.

In the composite pigment precursor, the strippable resin layer serves as an undercoat for the metal or metal compound layer and is used to strip the metal or metal compound layer from the sheet-shaped base member. Preferred examples of a resin for forming the strippable resin layer include polyvinyl alcohol, polyvinyl butyral, polyethylene glycol, polyacrylic acid, polyacrylic acid, polyacrylic amide, cellulose derivatives, acrylic polymers, and modified nylon resins.

The strippable resin layer can be formed in such a manner that a solution of one or more of the above resins is applied to the sheet-shaped base member and then dried. The solution, which is applied thereto, may contain an additive such as a viscosity modifier.

The solution, which is used to form the strippable resin layer, can be applied to the sheet-shaped base member by a known process such as a gravure coating process, a roll coating process, a blade coating process, an extrusion coating process, a dip coating process, or a spin coating process. After application and/or drying, the strippable resin layer may be surface-smoothed by calendering as required.

The thickness of the strippable resin layer is not particularly limited and is preferably 0.5 to 50 μm and more preferably 1 to 10 μm. When the thickness thereof is less than 0.5 μm, the amount of a dispersible resin is insufficient. When the thickness thereof is greater than 50 μm, the strippable resin layer is likely to be stripped from a pigment layer.

The sheet-shaped base member is not particularly limited and may be a releasable film. Examples of the releasable film include polytetrafluoroethylene films, polyethylene films, polypropylene films, polyester films such as polyethylene terephthalate films, polyamide films such as nylon 66 films and nylon 6 films, polycarbonate films, triacetate films, and polyimide films. In particular, the sheet-shaped base member is made of polyethylene terephthalate or a copolymer thereof.

The thickness of the sheet-shaped base member is not particularly limited and is preferably 10 to 150 μm. When the thickness thereof is 10 μm or more, the sheet-shaped base member has no problem with handling in producing steps. When the thickness thereof is 150 μm or less, the sheet-shaped base member is highly flexible and has no problem with rolling or releasing.

The metal or metal compound layer may be sandwiched between protective layers as disclosed in JP-A-2005-68250. Examples of the protective layers include silicon dioxide layers and protective resin layers.

The silicon dioxide layers are not particularly limited and may be those containing silicon dioxide. The silicon dioxide layers are preferably formed from a silicon alkoxide such as tetraalkoxysilane or a polymer thereof by a sol-gel process. In particular, the silicon dioxide layers are formed in such a manner that a solution prepared by dissolving the silicon alkoxide or the polymer in an alcohol is applied to the metal or metal compound layer, heated, and then fired.

The protective resin layers are not particularly limited and may be made of a resin insoluble in a dispersion medium. Examples of such a resin include polyvinyl alcohol, polyethylene glycol, polyacrylic acid, polyacrylamide, and cellulose derivatives. In particular, the protective resin layers are preferably made of polyvinyl alcohol or a cellulose derivative.

The protective resin layers can be formed in such a manner that an aqueous solution of one or more of these resins is applied to the metal or metal compound layer and then dried. The aqueous solution may contain an additive such as a viscosity modifier. The alcohol solution and the aqueous solution can be applied to the metal or metal compound layer by the same process as that used to apply the solution to the strippable resin layer.

The thickness of each protective resin layer is not particularly limited and is preferably 50 to 150 μm. When the thickness thereof is less than 50 μm, the protective resin layers have insufficient mechanical strength. When the thickness thereof is greater than 150 μm, the protective resin layers have extremely high strength; hence, it is difficult to rush and/or disperse the protective resin layers and the protective resin layers are possibly stripped from the metal or metal compound layer.

Colorant layers may be disposed between the protective resin layers and the metal or metal compound layer as disclosed in JP-A-2005-68251.

The colorant layers are used to obtain an arbitrary composite coloring pigment. The colorant layers are not particularly limited and may contain a colorant capable of exhibiting an arbitrary color tone or hue in addition to the metallic luster, brilliance, and background-masking ability of the metal pigment. The colorant contained in the colorant layers may be a known dye or pigment.

The term "pigment" as used herein covers natural pigments, synthetic organic pigments, and synthetic inorganic pigments defined in the field of general engineering.

A process for forming the colorant layers is not particularly limited. The colorant layers are preferably formed by a coating process. When the colorant contained in the colorant layers is a pigment, a colorant-dispersing resin is preferably used. The colorant-dispersing resin and the colorant are dispersed or dissolved in a solvent together with an additive, which is used as required, whereby a dispersion or solution is prepared. This dispersion or solution is preferably formed into uniform liquid films, which are dried into thin resin films. In the production of the composite pigment precursor, the colorant layers and the protective layers are preferably both formed by a coating process in view of working efficiency.

The composite pigment precursor may include a plurality of laminates including strippable resin layers identical to the strippable resin layer and metal or metal compound layers identical to the metal or metal compound layers. The thickness of each laminate, that is, the thickness of a metal or metal compound layer/strippable resin layer/metal or metal compound layer laminate or a strippable resin layer/metal or metal compound layer/strippable resin layer laminate excluding the sheet-shaped base member and the strippable resin layer directly disposed thereon is preferably 5,000 nm or less. When the thickness thereof is 5,000 nm or less, the composite pigment precursor has storage properties because cracking or stripping hardly occurs even if the composite pigment precursor is rolled. A pigment prepared from the composite pigment precursor has a good background-masking ability. The composite pigment precursor may have a configuration in which strippable resin layers and metal or metal compound layers are arranged on both surfaces of the sheet-shaped base member in that order. The composite pigment precursor is not limited to this configuration.

A process for stripping the metal or metal compound layer from the sheet-shaped base member is not particularly limited. Preferred examples of such a process include a process in which the composite pigment precursor is immersed in a liquid and a process in which the composite pigment precursor is immersed in a liquid and is also ultrasonically treated such that the metal or metal compound layer is stripped from the sheet-shaped base member and is pulverized.

Since the strippable resin layer serves as a protective colloid, a stable dispersion can be prepared in such a manner that the metal pigment, which contains the tabular particles, is dispersed in a solvent. Since the second ink composition contains the metal pigment, a resin originating from the strippable resin layer can render the underlayer adhesive.

The content of the metal pigment in the second ink composition is preferably 0.1% to 3.0%, more preferably 0.25% to 2.5%, and further more preferably 0.5% to 2.0% on a mass basis.

The second thermoplastic resin, which is contained in the second ink composition, may be any one as long as droplets of the second ink composition can be ejected by the ink jet recording method. The second thermoplastic resin is selected so as to have such a glass transition temperature as described below and may be any one selected from the examples of the first thermoplastic resin. The second thermoplastic resin may be the same in type as that of the first thermoplastic resin. This allows the adhesion between the underlayer and the metallic luster layer to be enhanced.

The second thermoplastic resin has a function of rendering the metal pigment, which is contained in the second ink composition, adhesive to prevent the removal of the metal pigment after the second ink composition is applied to the underlayer. This allows the metallic luster layer to have increased scratch resistance. The second thermoplastic resin also has a function of arranging the flat surfaces of the tabular particles in parallel to a surface of the underlayer to enhance the luster of metallic luster layer when the second ink composition contains the tabular particles. The mechanism of developing this function is not clear but is probably due to the distribution or change of the viscosity of the second ink composition. This function allows the metallic luster layer, which is disposed on the underlayer, to have a good metallic luster.

The second thermoplastic resin preferably has a weight-average molecular weight of 10,000 to 150,000 and more preferably 10,000 to 100,000. When the weight-average molecular weight of the second thermoplastic resin is less than 10,000, the effect of binding the metal pigment can be small during the adhesion of the second ink composition to the underlayer. When the weight-average molecular weight of the second thermoplastic resin is greater than 150,000, the viscosity of the second ink composition can be too large to eject droplets of the second ink composition from the ink jet recording apparatus.

The second thermoplastic resin may be present in the second ink composition in the form of a solution, an emulsion, or particles. When the second thermoplastic resin is present in the second ink composition in the form of particles, particles of the second thermoplastic resin preferably have a size of 0.1 to 20 μm and more preferably 0.5 to 10 μm. When the size of these particles is greater than 20 μm, the nozzles are possibly clogged.

The second thermoplastic resin preferably has a glass transition temperature higher than that of the first thermoplastic resin. The second thermoplastic resin has a large elastic modulus at a temperature lower than the glass transition temperature thereof and a small elastic modulus at a temperature higher than the glass transition temperature thereof. Therefore, the second thermoplastic resin is likely to plastically deform at temperatures higher than the glass transition temperature thereof. The glass transition temperature of the second thermoplastic resin is preferably 10° C. to 130° C., more preferably 15° C. to 110° C., further more preferably 20° C. to 85° C., and still further more preferably 25° C. to 60° C.

The difference in glass transition temperature between the first and second thermoplastic resins may be less than 5° C. This allows the metallic luster layer to have high scratch resistance and a high metallic luster.

The content of the second thermoplastic resin in the second ink composition is preferably 0.01% to 50%, more preferably 0.05% to 40%, and further more preferably 0.1% to 30% on a mass basis.

The second ink composition may further contain other components. Examples of such components include organic solvents, surfactants, colorants, dispersants, and stabilizers such as antioxidants and ultraviolet absorbers. When the second ink composition contains a colorant, the metallic luster layer is colored and therefore has a colored metallic luster. These components are substantially the same as those contained in the first ink composition and are not redundantly described.

Properties of the first and second ink compositions are not particularly limited. The first and second ink compositions preferably have a surface tension of, for example, 20 to 50 mN/m. When the surface tension of the first and second ink compositions is less than 20 mN/m, the first and second ink compositions spread around the nozzles or flow out of the nozzles and therefore it can be difficult to eject droplets of the first and second ink compositions. When the surface tension thereof is greater than 50 mN/m, the first and second ink compositions do not spread on a target and therefore any good print cannot be possibly obtained.

The first and second ink compositions preferably have a viscosity of 2 to 10 mPa·s and more preferably 3 to 5 mPa·s at 20° C. When the viscosity of the first and second ink compositions is within the above range at 20° C., the first and second ink compositions are fit for the ink jet recording apparatus and appropriate amounts of the first and second ink compositions are ejected from the nozzles; hence, the curved flight and/or scattering of the first and second ink compositions can be prevented.

According to the ink jet recording method, an image with a good metallic luster can be recorded on a recording medium such as a sheet of plain paper.

A record obtained by the ink jet recording method includes a recording medium having a metallic surface with a high luster.

An ink set used in this embodiment contains, for example, the first and second ink compositions. The ink set may contain a plurality of first ink compositions identical to the first ink composition and a plurality of second ink compositions identical to the second ink composition or may contain one or more additional ink compositions in addition to the first and second ink compositions. Examples of the additional ink compositions include color ink compositions such as cyan ink compositions, magenta ink compositions, yellow ink compositions, light cyan ink compositions, light magenta ink compositions, dark yellow ink compositions, red ink compositions, green ink compositions, blue ink compositions, orange ink compositions, and violet ink compositions; black ink compositions; and light black ink compositions.

An ink cartridge used in this embodiment includes the ink set. This allows an ink set containing a photocurable ink composition for ink jet recording to be readily carried. The ink jet recording apparatus includes the above ink compositions, the ink set, or the ink cartridge and is as described above.

EXAMPLES

The present invention is further described in detail with reference to examples and comparative examples. The examples are not intended to limit the scope of the present invention.

Recording media used in the examples and comparative examples were sheets of plain paper, Xerox 4024, available from Fuji Xerox Co., Ltd. The plain paper sheets included no coat layer.

First ink compositions and second ink compositions were prepared as described below. The first and second ink compositions were measured for viscosity with a viscometer, AMVn, available from Anton Paar GmbH.

The following mixture was used to prepare a first ink composition A1: a solvent mixture of 20.0 parts by mass of γ-valerolactone, 65.5 parts by mass of diethylene glycol diethyl ether, and 10.0 parts by mass of tetraethylene glycol monobutyl ether.

The solvent mixture and 2.0 parts by mass of a dispersant, Solsperse 32000, available from Avecia K. K. were mixed together with a dissolver at a rate of 3,000 rpm for one hour, the dispersant being a polyester compound. This mixture was stirred in a bead mill containing zirconia beads with a size of 2 mm and further stirred a nano-mill containing zirconia beads with a size of 0.3 mm, whereby a dispersion was prepared.

To the dispersion, 2.5 parts by mass of a first thermoplastic resin having a molecular weight of 60,000 and a glass transition temperature of 50° C. was added while the dispersion was being stirred at a rate of 4,000 rpm, whereby the first ink composition A1 was prepared. The first thermoplastic resin was poly(isobutyl methacrylate), Paraloid B-67, available from Rohm and Haas Company. The first ink composition A1 had a viscosity of 4.1 mPa·s at 20° C.

A first ink composition A2 was prepared in substantially the same manner as that used to prepare the first ink composition A1 except that a first thermoplastic resin used had a molecular weight of 60,000 and a glass transition temperature of 75° C. and was a methyl methacrylate-butyl methacrylate copolymer, Paraloid B-60, available from Rohm and Haas Company, the amount of this first thermoplastic resin was 3.0 parts by mass, and the amount of diethylene glycol diethyl ether used was 65 parts by mass. The first ink composition A2 had a viscosity of 3.9 mPa·s at 20° C.

A first ink composition A3 was prepared in substantially the same manner as that used to prepare the first ink composition A1 except that a first thermoplastic resin used had a molecular weight of 80,000 and a glass transition temperature of 105° C. and was poly(methyl methacrylate), Degalan M825, available from Degussa Roehm GmbH, the amount of this first thermoplastic resin was 2.0 parts by mass, and the amount of diethylene glycol diethyl ether used was 64.5 parts by mass. The first ink composition A3 had a viscosity of 4.4 mPa·s at 20° C.

In order to obtain a metal pigment added to second ink compositions, a metal pigment dispersion was prepared as described below.

The following solution was prepared: a resin coating solution containing 3.0% cellulose acetate butyrate available from Kanto Chemical Co., Inc. and 97% diethylene glycol diethyl ether available from Nippon Nyukazai Co., Ltd. on a mass basis. The resin coating solution was uniformly applied to a polyethylene terephthalate (PET) film with a thickness of 100 μm by a bar coating process and then dried at 60° C. for ten minutes, whereby a thin resin layer was formed on the PET film.

An vapor-deposited aluminum layer having a thickness of 20 nm was formed on the resin layer with a vacuum vapor deposition system, VE-1010, available from Vacuum Device Inc., whereby a laminate was prepared.

The laminate was immersed in diethylene glycol diethyl ether. The vapor-deposited aluminum layer was stripped from the PET film, pulverized, and dispersed in diethylene glycol diethyl ether with an ultrasonic disperser, VS-150, available from As One Corporation in a single operation, whereby a metal pigment dispersion stock was prepared. The total time of ultrasonic dispersion was 12 hours.

The metal pigment dispersion stock was filtered through a SUS mesh filter with 5-μm openings, whereby coarse particles were removed from the metal pigment dispersion stock. The filtrate was poured in a round-bottomed flask. Diethylene glycol diethyl ether was distillated off from the filtrate with a rotary evaporator, whereby the filtrate was condensed. The concentration of the filtrate was adjusted, whereby a metal pigment dispersion containing 5% by mass of a metal pigment containing tabular particles was prepared.

The metal pigment dispersion was measured for particle size distribution and 50% average particle size with a laser particle size distribution analyzer, LMS-30, available from Seishin Enterprise Co., Ltd. This showed that the metal pigment dispersion had a 50% average particle size of 1.03 μm and a maximum particle size of 4.9 μm.

The tabular particles were measured for size and thickness with a particle size distribution analyzer, FPIA-3000S, available from Sysmex Corporation. As a result, the average size of the tabular particles was 3.2 μm, the 50% average particle size based on the equivalent circle diameter determined from the longitudinal size-transverse size (X-Y) plane of each tabular particle was 0.89 μm, and the average thickness of the tabular particles was 0.02 μm. The ratio R50/Z was 44.5, wherein R50 represents the 50% average particle size based on the equivalent circle diameter determined from the longitudinal size-transverse size (X-Y) plane of each tabular particle and Z represents the average thickness of the tabular particles. The size distribution (CV) of the tabular particles was 38.2 as determined from the equation CV=(standard deviation of size distribution)/(average particle size)×100.

Ten of the tabular particles were randomly selected with an electronic microscope and then measured for thickness. The average thickness of the ten tabular particles was 20 nm.

The following mixture was used to prepare a second ink composition B1: a solvent mixture of 20.0 parts by mass of γ-valerolactone, 45.5 parts by mass of diethylene glycol diethyl ether, and 10.0 parts by mass of tetraethylene glycol monobutyl ether.

This solvent mixture, 20 parts by mass of the metal pigment dispersion, and 2.0 parts by mass of a dispersant, Solsperse 32000, available from Avecia K. K. were mixed together with a dissolver at a rate of 3,000 rpm for one hour, the dispersant being a polyester compound. This mixture was stirred in a bead mill containing zirconia beads with a size of 2 mm and further stirred in a nano-mill containing zirconia beads with a size of 0.3 mm, whereby a dispersion was prepared.

To this dispersion, 2.5 parts by mass of a second thermoplastic resin having a molecular weight of 60,000 and a glass transition temperature of 50° C. was added while this dispersion was being stirred at a rate of 4,000 rpm, whereby the second ink composition B1 was prepared. The second thermoplastic resin was poly(isobutyl methacrylate), Paraloid B-67, available from Rohm and Haas Company. The second ink composition B1 had a viscosity of 4.1 mPa·s at 20° C. The second ink composition B1 had substantially the same composition as that of the first ink composition A1 except that the second ink composition B1 contained one part by mass of the metal pigment.

A second ink composition B2 was prepared in substantially the same manner as that used to prepare the second ink composition B1 except that a second thermoplastic resin used had a molecular weight of 60,000 and a glass transition temperature of 75° C. and was a methyl methacrylate-butyl methacrylate copolymer, Paraloid B-60, available from Rohm and Haas Company, the amount of this first thermoplastic resin was 3.0 parts by mass, and the amount of diethylene glycol diethyl ether used was 45 parts by mass. The second ink composition 82 had a viscosity of 3.9 mPa·s at 20° C. The second ink composition B2 had substantially the same composition as that of the first ink composition A2 except that the second ink composition B2 contained one part by mass of the metal pigment.

A second ink composition B3 was prepared in substantially the same manner as that used to prepare the second ink composition B1 except that a first thermoplastic resin used had a molecular weight of 80,000 and a glass transition temperature of 105° C. and was poly(methyl methacrylate), Degalan M825, available from Degussa Roehm GmbH, the amount of this first thermoplastic resin was 2.0 parts by mass, and the amount of diethylene glycol diethyl ether used was 46 parts by mass. The second ink composition B3 had a viscosity of 4.4 mPa·s at 20° C. The second ink composition B3 had substantially the same composition as that of the first ink composition A3 except that the second ink composition B3 contained one part by mass of the metal pigment.

Samples of the examples and samples of the comparative examples were prepared with an ink jet recording apparatus, that is, an ink jet printer, SP-300V, available from Roland DG. In the ink jet printer, each of the first ink compositions A1 to A3 was used instead of a cyan ink and each of the second ink compositions B1 to B3 was used instead of a yellow ink. A magenta ink and a black ink were used in the ink jet printer. A temperature-controllable roller was attached to the ink jet printer such that a printing position on a sheet of plain paper was capable of being heated.

Each sample was subjected to printing in such a manner that an underlayer was formed using a corresponding one of the first ink compositions A1 to A3 at a underlayer-forming temperature shown in Table 1 and a metallic luster layer was formed on the underlayer using a corresponding one of the second ink compositions E1 to B3. A uniform solid image was printed on the sample in such a print mode that a medium was "plain paper" and printing quality was "clear". The amount of ink used to form each of the underlayer and the metallic luster layer was 1.6 mg/cm$^2$. After being prepared, all the samples were dried at room temperature and then evaluated.

The samples were evaluated by visual inspection. Evaluation standards were as follows: a sample with an excellent luster was rated as AA, a sample with a good luster was rated as A, and a sample with an insufficient luster was rated as C. The evaluation results were summarized in Table 1.

TABLE 1

| | | Examples | | | | | | Comparative Examples | | |
|---|---|---|---|---|---|---|---|---|---|---|
| | | 1 | 2 | 3 | 4 | 5 | 6 | 1 | 2 | 3 |
| Underlayer-forming temperatures(° C.) | | 60 | 60 | 60 | 80 | 80 | 110 | 80 | 110 | 110 |
| First ink compositions | Type | A1 | A1 | A1 | A2 | A2 | A3 | A2 | A3 | A3 |
| | Tg of first thermoplastic resins (° C.) | 50 | 50 | 50 | 75 | 75 | 105 | 75 | 105 | 105 |
| Second ink compositions | Type | B1 | B2 | B3 | B2 | B3 | B3 | B1 | B1 | B2 |
| | Tg of second thermoplastic resins (° C.) | 50 | 75 | 105 | 75 | 105 | 105 | 50 | 50 | 75 |
| Evaluation results | | A | A | A | A | A | A | C | C | C |

As is clear from Table 1, the samples of the examples have a good luster because the glass transition temperatures of the first thermoplastic resins contained in these samples are lower than or equal to those of the second thermoplastic resins contained therein. However, the samples of the comparative examples have no good luster because the glass transition temperatures of the first thermoplastic resins contained in these samples are higher than those of the second thermoplastic resins contained therein. This suggests that, in the examples, the first ink compositions A1 to A3 are prevented from penetrating the plain paper sheets (the recording media) during the formation of the underlayers and the underlayers have a smooth surface.

An ink jet recording method according to the present invention is capable of recording an image with a good metallic luster on a recording medium such as a sheet of plain paper. Therefore, the following demand can be met: for example, a demand that an image with a metallic luster is readily printed with an inexpensive printer at low cost.

What is claimed is:

1. An ink jet recording method for recording an image having a metallic luster on a recording medium using an ink jet recording apparatus, comprising:

forming an underlayer on the recording medium by applying droplets of a first ink composition containing a first thermoplastic resin to the recording medium; and forming a metallic luster layer on the underlayer by applying droplets of a second ink composition containing a metal pigment and a second thermoplastic resin to the underlayer, wherein the glass transition temperature of the first thermoplastic resin is lower than or equal to the glass transition temperature of the second thermoplastic resin and the underlayer is formed at a temperature higher than the glass transition temperature of the first thermoplastic resin.

2. The ink jet recording method according to claim 1, wherein the first and second thermoplastic resins have a glass transition temperature of 25° C. to 60° C.

3. The ink jet recording method according to claim 1, wherein the difference in glass transition temperature between the first and second thermoplastic resins is less than 5° C.

4. The ink jet recording method according to claim 1, wherein the first and second thermoplastic resins are of the same type.

5. The ink jet recording method according to claim 1, wherein the underlayer is formed at a temperature higher than or equal to the glass transition temperature of the first thermoplastic resin.

6. The ink jet recording method according to claim 1, wherein the underlayer is formed at a temperature of 40° C. to 90° C.

7. The ink jet recording method according to claim 1, wherein the metal pigment contains tabular particles made of aluminum or an aluminum alloy and the 50% average particle size based on the equivalent circle diameter determined from the area of the X-Y plane of each tabular particle is 0.5 to 3 μm and satisfies the inequality R50/Z>5, where R50 represents the 50% average particle size, X and Y represent the longitudinal size and transverse size, respectively, of a flat surface of the tabular particle, and Z represents the thickness of the tabular particle.

8. A record comprising:

a recording medium; and an image, formed on the recording medium by the ink jet recording method according to claim 1, having a metallic luster.

* * * * *